(12) United States Patent
Adamovits et al.

(10) Patent No.: US 6,618,819 B1
(45) Date of Patent: Sep. 9, 2003

(54) SPARING SYSTEM AND METHOD TO ACCOMMODATE EQUIPMENT FAILURES IN CRITICAL SYSTEMS

(75) Inventors: Peter J. Adamovits, Carleton Place (CA); Keith C. Dysari, Stitsville (CA); Gregory A. Waines, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/471,240

(22) Filed: Dec. 23, 1999

(51) Int. Cl.[7] ................................................ G06F 11/00
(52) U.S. Cl. ........................................... 714/13; 714/15
(58) Field of Search ................................ 714/13, 15, 4, 714/23, 24

(56) References Cited

U.S. PATENT DOCUMENTS

| | | | |
|---|---|---|---|
| 5,608,865 A | * | 3/1997 | Midgely et al. ................. 714/1 |
| 5,664,090 A | * | 9/1997 | Seki et al. ...................... 714/13 |
| 5,828,569 A | * | 10/1998 | Fisher ............................ 700/5 |
| 5,848,128 A | * | 12/1998 | Frey ............................ 370/217 |
| 5,974,114 A | * | 10/1999 | Blum et al. ................... 370/217 |
| 6,085,333 A | * | 7/2000 | DeKoning et al. .............. 714/7 |
| 6,189,112 B1 | * | 2/2001 | Slegel et al. .................... 714/10 |
| 6,202,067 B1 | * | 3/2001 | Blood et al. ................... 707/10 |
| 6,205,557 B1 | * | 3/2001 | Chong et al. ................. 379/272 |
| 6,308,286 B1 | * | 10/2001 | Richmond et al. ............. 714/10 |

* cited by examiner

*Primary Examiner*—Robert Beausoliel
*Assistant Examiner*—Marc Duncan

(57) ABSTRACT

A sparing system and method of accommodating failure of equipment in critical systems comprises, in one embodiment, 1:n sparing where an equipment spare is provided for every n pieces of equipment in the system. The spare equipment includes journal memory wherein an image of the operating system, applications and state of each piece of equipment being spared for can be maintained. The image information is updated at appropriate intervals when the equipment is operating without a failure and, in the event of a piece of equipment failing, the spare equipment loads the state of failed equipment from the corresponding image and commences executing the software in the corresponding image, thus resuming performance of the activities of the failed equipment. In a second embodiment, m:n sparing is provided wherein m pieces of spare equipment are provided for n pieces of equipment to accommodate m failures of the equipment.

11 Claims, 7 Drawing Sheets

SPARING SYSTEM AND METHOD TO ACCOMMODATE EQUIPMENT FAILURES IN CRITICAL SYSTEMS

FIELD OF THE INVENTION

The present invention relates to a method and system for providing protection from a failure of equipment in critical systems. More specifically, the present invention relates to a sparing method and system for accommodating an equipment failure by providing and utilizing spare equipment.

BACKGROUND OF THE INVENTION

It is known to provide redundant, or spare, equipment to replace or substitute for failed equipment in critical systems. For example, in critical equipment such as telephone switches or online transaction processing systems, it is well known to provide a redundant, or spare, power supply which is employed to keep the system running if a failure is detected in the primary power supply. In the event of such a failure, the spare power supply is substituted for the failed primary power supply, ideally in such a manner that operation of the system is not interrupted. Indeed, much study has been performed to identify points of failure in such critical systems and especially to identify single failure points, such as power supplies, where the single failure can result in an entire system failing.

In many circumstances, while spare equipment and failure detection means are provided, the switch-over from the failed equipment to the spare equipment is not without a cost. For example, while a battery can be provided to maintain a supply of power to equipment while a change from a primary power supply to a spare power supply is performed, in other circumstances, such as failure of a processor or communications link in an online transaction processing system, an interruption to the processing of the transaction data or even a loss of such data can occur.

Critical systems for which spare equipment is generally required can include telecommunication and/or data switching equipment, avionics systems, manufacturing and/or process control systems, etc. and such systems are often carefully designed to reduce or eliminate single failure points and to provide spare equipment.

Using switching equipment as a specific example, such equipment typically includes several network interface processors, each of which can include one or more microprocessors, memory, etc. and each of which operates to implement and maintain network connections and protocols. To date, sparing for the network interface processors in a switch has been provided by either including a spare network interface processor for each network interface processor in the switch, referred to as 1:1 sparing, or by providing a single spare which can be employed as a spare for any failed network interface processor of the n network interface processors in the switch, referred to as 1:n sparing.

Each of these sparing strategies has suffered disadvantages. Specifically, 1:1 sparing requires twice the amount of equipment than is in use at any one time and thus is very expensive to implement, raising the cost of ownership (manufacturing or lease, operation, including supply of power and cooling, etc.) of the critical system. While a critical system which employs 1:n sparing is less expensive to own and/or operate, as it only requires a singe spare for the n pieces of equipment, it suffers a disadvantage in that substituting the spare equipment for a failed piece of equipment requires time to bring the spare equipment from an idle state to the state required of the failed equipment. This time period from idle to running as a substitute can often exceed a critical time, such as the drop time (the maximum time a connection will be maintained when the network interface processor controlling the connection is inoperative) in the case of a telecommunication switch. In this example, if the drop time is exceeded, the connections controlled by the failed network interface processor are dropped and must be re-established once the formerly spare network interface processor is running in place of the failed network processor. Reconnection of such dropped connections can require multiple minutes to achieve and thus connections can be lost for unacceptable time periods. Similarly, avionics and other critical systems have critical times within which service must be, or is desired to be, restored.

It is therefore desired to have a better method and system to cope with equipment failures in critical systems, such telecommunication and/or data switching equipment, etc.

SUMMARY OF THE INVENTION

It is an object of the present invention to provide a novel sparing method and system to accommodate equipment failures in critical systems which obviates or mitigates at least one disadvantage of the prior art.

According to a first aspect of the present invention, there is provided a sparing method to accommodate equipment failures in a critical system comprising n pieces of equipment and at least one spare piece of equipment for said n pieces of equipment, comprising the steps of:

(i) loading software onto each of said n pieces of equipment;

(ii) commencing execution of said loaded software with said respective piece of equipment;

(iii) transferring an image of said loaded software on each of said n pieces of equipment to a memory on said at least one spare piece of equipment;

(iv) detecting a failure of one of said n pieces of equipment;

(v) causing said at least one spare piece of equipment to replace said detected one piece of equipment by commencing execution of said corresponding image of said loaded software and configuring said system and the non-failed ones of said n pieces of equipment to employ said at least one spare piece of equipment in place of said detected one piece of equipment.

According to another aspect of the present invention, there is provided a sparing system to accommodate equipment failures in a critical system comprising:

n pieces of equipment, each piece of equipment including a memory to maintain software to be executed by said piece of equipment and state information for said piece of equipment;

at least one spare piece of equipment including a journal memory to store an image of said software maintained in said memory of each of said n pieces of equipment;

a communication path between each of said n pieces of equipment and said at least one spare piece of equipment to allow transfer of an image of said software to be executed by each said piece of equipment to said journal memory, each of said n pieces of equipment operable to transfer a respective one of said images to said journal memory; wherein upon determination that one of said n pieces of equipment has experienced a failure, said at least one spare piece of equipment loads said image corresponding to said one piece of equipment and operates to execute said image to replace said one piece of equipment.

In one embodiment, the present invention provides a system and method of accommodating failure of equipment in critical systems through 1:n sparing, where an equipment spare is provided for every n pieces of equipment in the system. The spare equipment includes journal memory wherein an image of the operating system, applications and state of each piece of equipment being spared for can be maintained. The image information is updated at appropriate intervals when the equipment is operating without a failure and, in the event of a piece of equipment failing, the spare equipment loads the state of failed equipment from the corresponding image and commences executing the software in the corresponding image, thus resuming performance of the activities of the failed equipment. In a second embodiment of the present invention, m:n sparing is provided and employed.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Critical equipment, such as avionics, process control systems data communication switches, etc. can require the provision of redundant, or spare, equipment to ensure acceptable and/or safe operation. While the following discussion will focus on telecommunication and/or data switches, the applicability of the present invention is not so limited. It is contemplated that the present invention will have wide applicability to sparing for critical equipment in a wide variety of applications and environments.

Figure 1:
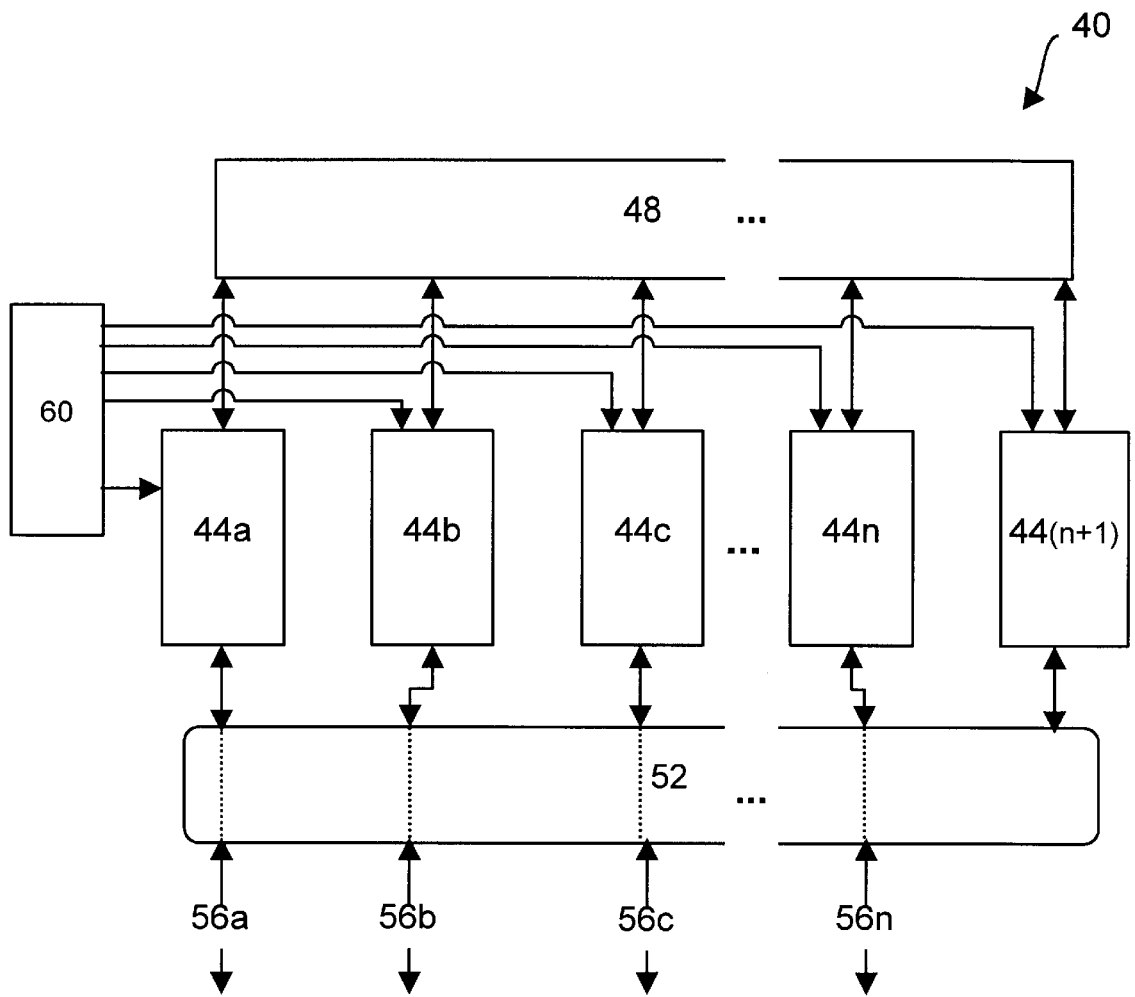
FIG. 1 shows a prior art data switch with 1:n sparing.

A prior art telecommunications and/or data switch is indicated generally at 40 in FIG. 1. Switch 40 comprises a plurality of network interface processors 44a through 44(n+1). Each network interface processor 44 can include one or more microprocessors, memory, etc. In switch 40, network interface processors 44a through 44n normally operate to establish and maintain connections and network interface processor 44(n+1) is provided as a spare and each processor 44a through 44(n+1) are generally interchangeable, being similar in manufacture and capabilities.

Each network interface processor 44 is connected to a crossbar switch, or fabric 48, and a sparing panel 52. Each network interface processor 44 is connected, via sparing panel 52, to a respective network cabling line 56 through which multiple connections can be established and maintained.

In switch 40, if a network interface processor 44 suffers a failure, network interface processor 44(n+1), which is the spare, is loaded with the operating system, applications and connections state of the failed processor 44 and sparing panel 52 switches the respective network cabling line 56 of the failed processor 44 to network interface processor 44(n+1). As used herein, the term "failure" is intended to include any failure mode or state wherein it is desired or required to substitute a spare for a particular piece of equipment. For example, it is contemplated that a network interface processor 44 can experience an error or fault which merely degrades its ability to operate in the normal manner and, assuming the level of degradation can be tolerated, this would not constitute a failure as contemplated herein. The method of detection of failures is well known and can include watchdog timers on processors 44, handshaking protocols with processor controllers 60, monitoring of the system's operation by a human operator, etc. and will not be further discussed herein.

In the event of the failure of a network interface processor 44, the processor controllers 60 of switch 40 then reconfigure each non-failed network interface processor 44 to direct existing connections from the failed network interface processor 44 to the spare network interface processor 44(n+1).

Figure 2:
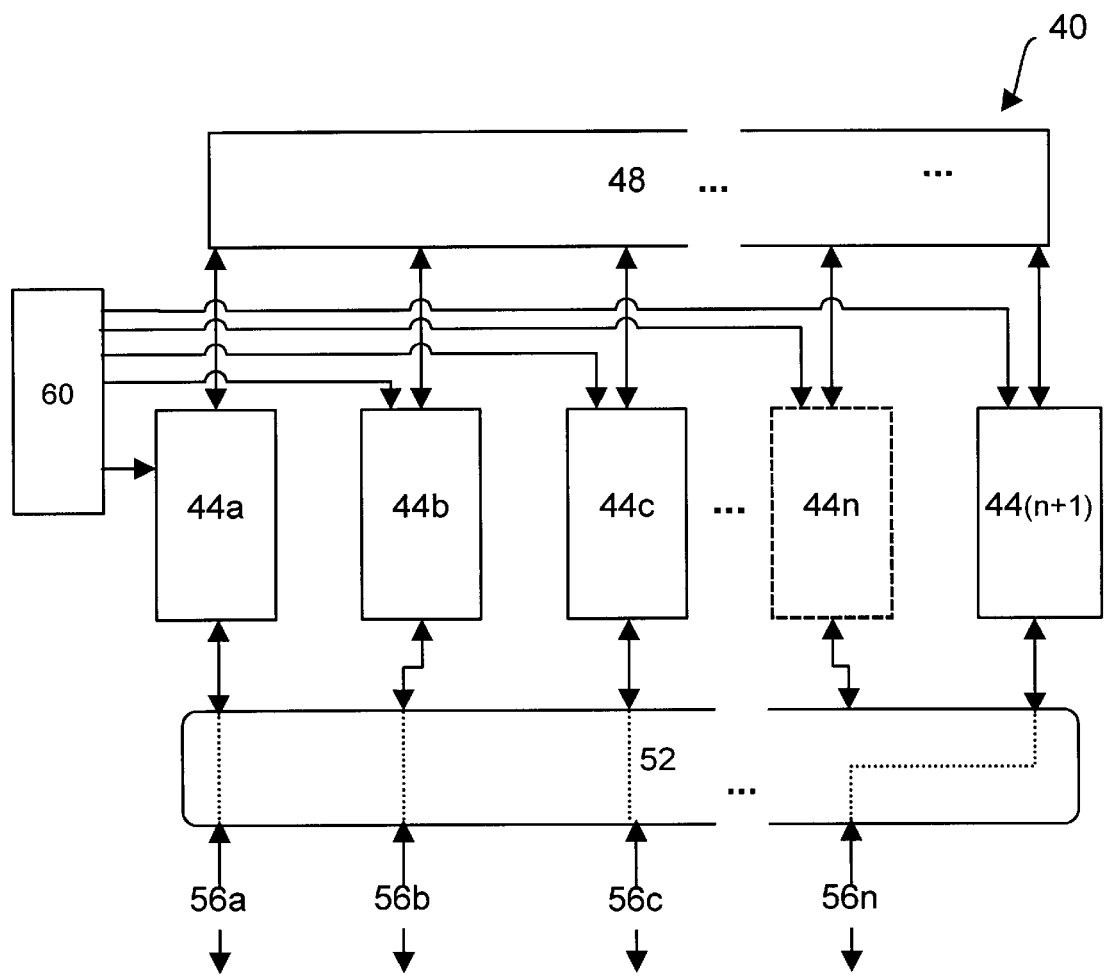
FIG. 2 shows the switch of FIG. 1 with the spare network interface processor operating.

FIG. 2 shows an example wherein network interface processor 44n has suffered a failure (as indicated by the ghosted line used to represent this element) and line 56d has been switched to network interface processor 44(n+1) by sparing panel 52.

While prior art switch 40 does provide 1:n sparing, as mentioned above a problem does exist in that the time required to load the operating system, applications and connection states of a failed processor onto network interface processor 44(n+1) can be significant, for example requiring more than two minutes for the re-establishment of the first connection and as many as ten or more minutes to re-establish the last connection, thus any connections present on the respective network cabling line 56 of a failed processor are almost certainly terminated/dropped before network interface processor 44(n+1) can be brought to an active state to replace the failed network interface processor 44.

The operating system and applications can only be loaded onto network processor 44(n+1) after a failure has occurred as each network interface processor 44 can be executing a different version of the operating system and/or different application programs. Thus to replace a failed processor 44, network interface processor 44(n+1) must execute the same applications, and usually, the same operating system as the failed processor 44.

Figure 3:
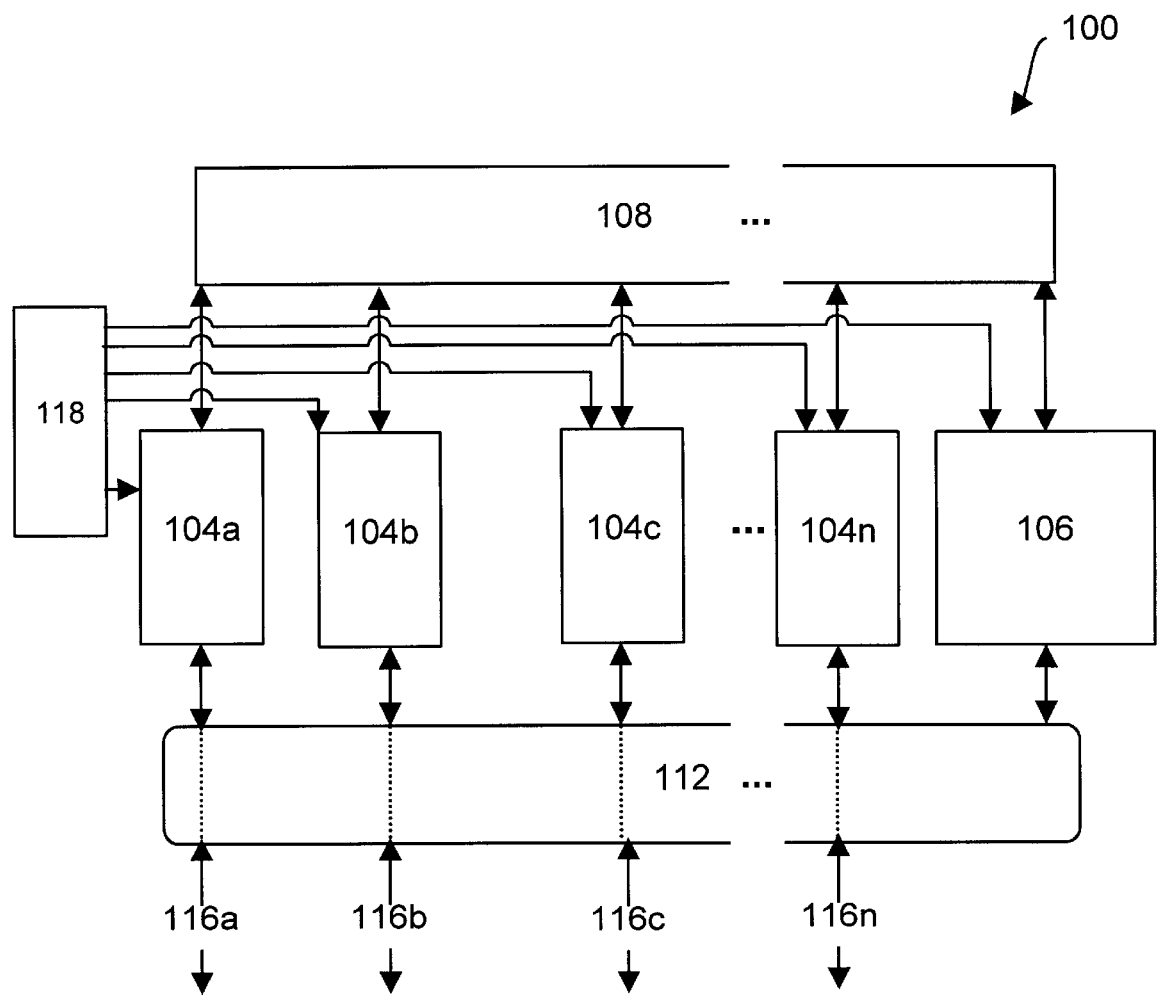
FIG. 3 shows a first embodiment of the present invention wherein a data switch is constructed with 1:n sparing.

FIG. 3 shows a telecommunications and/or data switch 100 in accordance with the present invention. Much like prior art switch 40, switch 100 comprises a plurality of network interface processors 104a through 104n and a spare network interface processor 106. In switch 100, network interface processors 104a through 104n normally operate to establish and maintain connections and network interface processor 106 is provided as a spare.

Each network interface processor 104 and spare network interface processor 106 is connected to a crossbar switch, or fabric 108, and to a sparing panel 112. In normal operation, each network interface processor 104 is connected, via sparing panel 112, to a respective network cabling line 116 through which multiple connections can be established and maintained and spare processor 106 is not connected. Processor controllers 118 are also provided.

Figure 4:
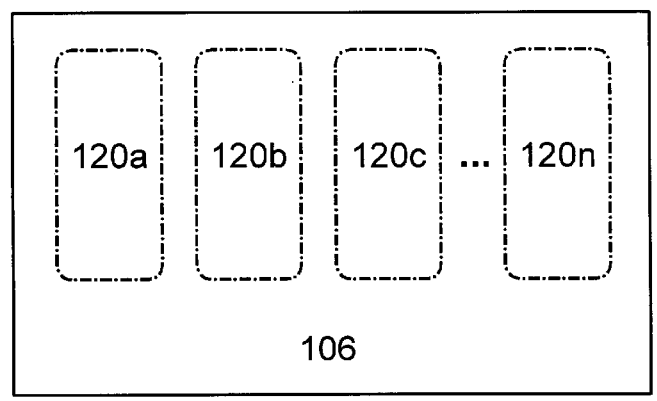
FIG. 4 shows blocks of journal memory in the spare network interface processor of FIG. 3.

Unlike the case with prior art switch 40, in switch 100 spare network interface processor 106 is constructed differently than network interface processors 104a through 104n. Specifically, as shown in FIG. 4, spare network interface processor 106 includes the functionality of network interface processors 104, such as the microprocessors and other components, but is also provided with a journal memory, arranged in blocks 120. Each block 120 corresponds to a network interface processor 104 that spare network interface processor 106 spares for. Each block of journal memory 120 stores an image of the state (connection records and/or hardware state) of its corresponding network interface processor 104 and the operating system and applications being executed thereon. For example, block 120a maintains an image of network interface processor 104a, block 120b maintains an image of network interface processor 104b, etc.

Image information is transferred to spare processor 106 from each network interface processor 104 through fabric 108, through control lines between network interface processors 104 and spare processor 106 or through any other suitable communications path as will occur to those of skill in the art. When a network interface processor 104 is started, and the operating system and applications are loaded and start to execute, network interface processor 104 starts to transfer image information to its corresponding block of journal memory 120 in spare processor 106. Initially, a significant amount of information, mainly an image of the loaded operating system and applications, must be transferred to block 120.

The speed with which this is accomplished can depend upon a variety of factors, including: the processing load of network interface processor 104; the size of the operating system and applications; the number of processor 104 in switch 100; the processor load of spare processor 106 (which would largely consist at this point of receiving journal information from the network interface processors in switch 100); and the available data transmission bandwidth that is available for data transfer from network interface processor 104 and spare processor 106.

Once the initial loading of blocks 120 is accomplished, a steady state is reached wherein additional image information is transferred to spare processor 106 as the state of each network interface processor 104 changes by a preselected amount. As discussed below, this preselected amount can be defined as a number of clock cycles, the time at which one of a selected list of events occurs (e.g. —a connection is established or terminated), or any other suitable interval as will occur to those of skill in the art.

Figure 5:
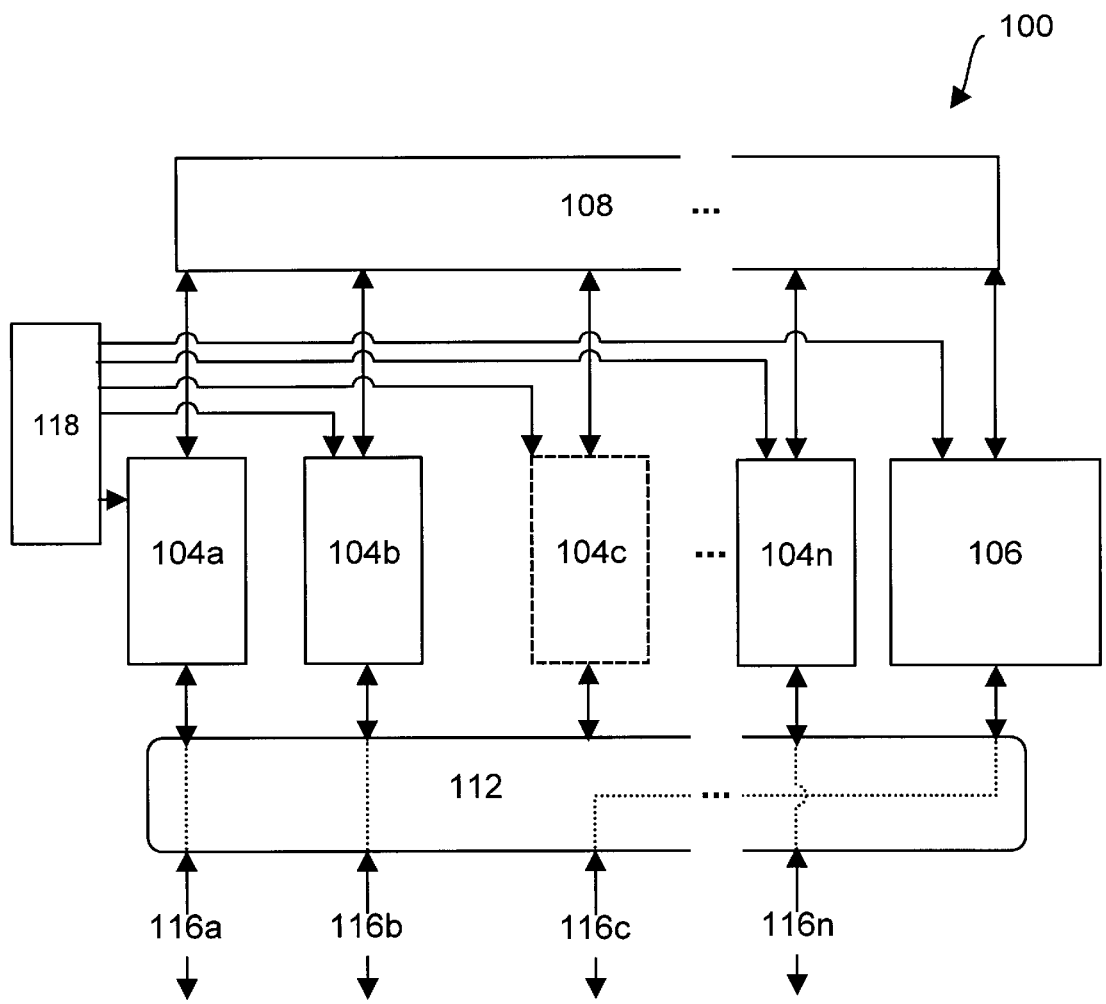
FIG. 5 shows the switch of FIG. 3 with the spare network interface processor operating.
Figure 6:
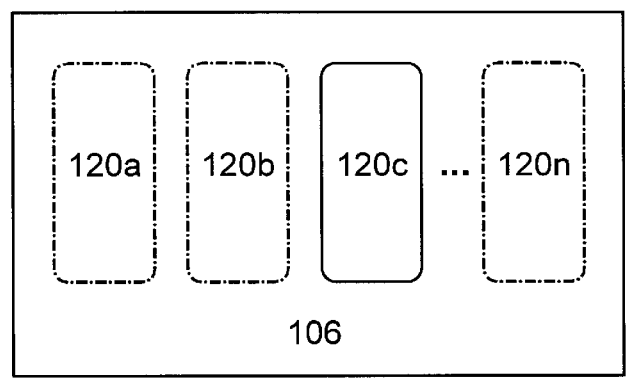
FIG. 6 shows a block of journal memory having been selected and being operated upon by the spare network interface processor.

In the example of FIGS. 5 and 6, network interface processor 104c has experienced a failure. As shown, when the failure of network interface processor 104c is determined (as indicated by this element being drawn in ghosted line), spare processor 106 commences to load and execute the image stored in the corresponding block 120c of its journal memory, sparing switch 112 connects network cabling line 116c to spare processor 106 and each remaining operating network interface processor 104 is reconfigured to direct existing connections from the failed network interface processor 104c to spare processor 106. As network interface processors 104 are reconfigured to redirect existing connections to spare 106 instead of failed network interface processor 104c, they are also reconfigured to cease sending image information to spare processor 106.

As spare processor 106 need only load state information from, and commence execution of, the image in the appropriate block 120 of journal memory, it can be operating as a replacement for a failed network interface processor 104 in a very quick manner, such as in tens of milliseconds, rather than multiple minutes, thus reducing the likelihood that a connection will be dropped or suffer significant (unacceptable) data traffic loss.

It will be apparent to those of skill in the art that, as image information is transferred to spare processor 106 after changes have occurred in a network interface processor 104, the images in the journal memory will always be out of date to some extent with respect to the actual state of the operating network interface processors 104. It is presently preferred that such transfers of image information be performed in as near to real time as possible, so that the differences between the state of the network interface processors 104 and the stored images will be small and will not often result in a connection being dropped. However, the considerations involved in achieving such near real time transfers can include the available processing capacity in spare processor 106 to receive and update image information from each network interface processor 104, the availability of processor capacity in each network interface processor 104 to construct and transmit image information to spare processor 106 and the degree to which differences in the image information in blocks 120 and the current image of each network interface processor 104 can be tolerated. Designers of switch 100 can appropriately select the interval with which changes to the image information are transferred from network interface processors 104 to spare 106.

In cases wherein processing capacity in switch 100 may be very constrained, it is contemplated that only operating system and application image information will be sent to spare processor 106 and that the state information will be omitted. While this can result in a greater number of connections being dropped, it will still result in switch 100 being restored to its full operating capacity faster than would be the case with prior art 1:n sparing designs.

As will be apparent to those of skill in the art, failed network interface processor 44c can then be replaced or repaired, as desired. As will also be apparent to those of skill in the art, the present invention is not limited to use with telecommunications and/or data switches. In fact, the present invention has applicability to any systems which employ multiple processors and in which it is desired to provide 1:n sparing in a manner which allows relatively rapid startup of a spare processor.

Figure 7:
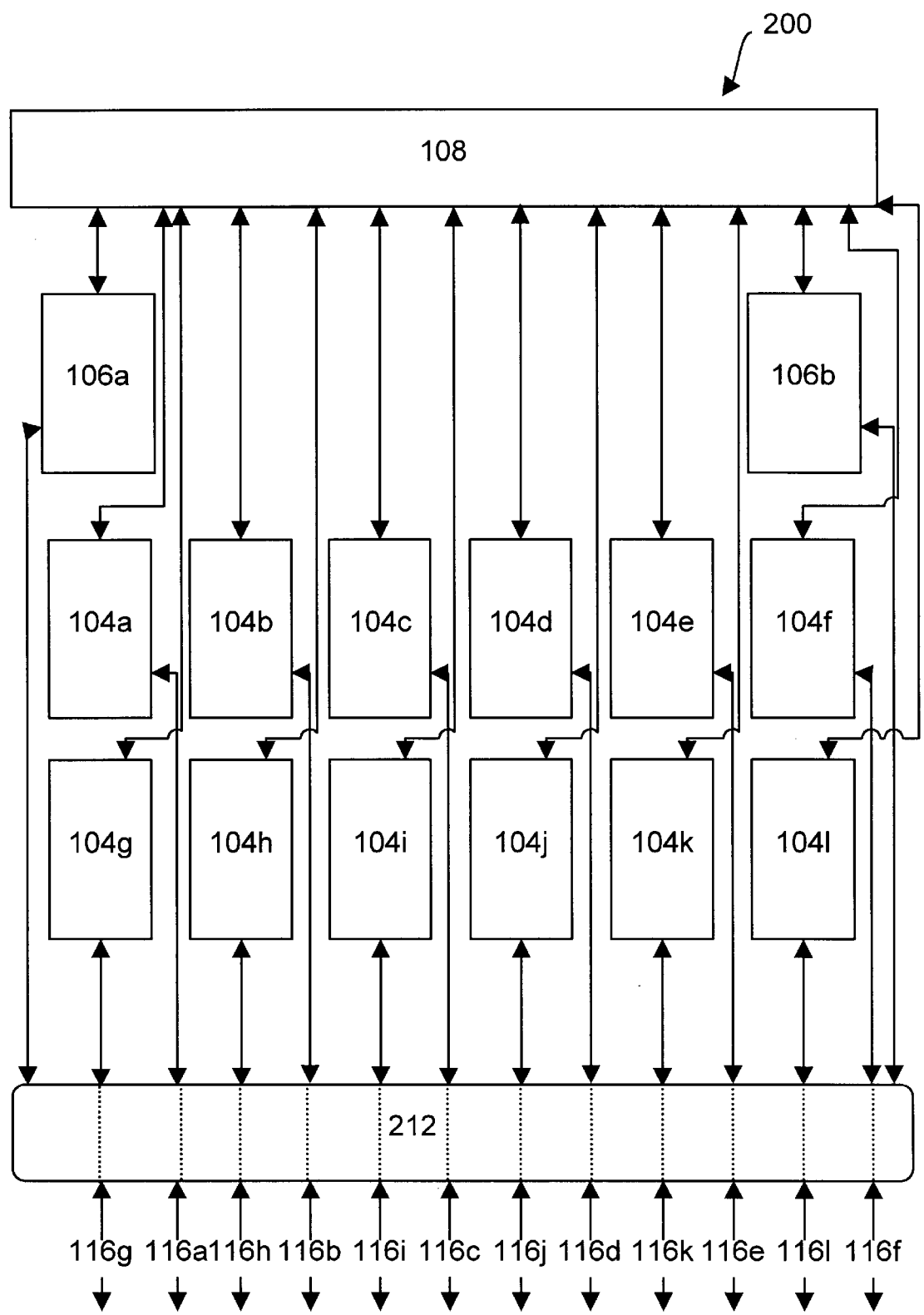
FIG. 7 shows a second embodiment of the present invention wherein a data switch is constructed with m:n sparing.
Figure 8:
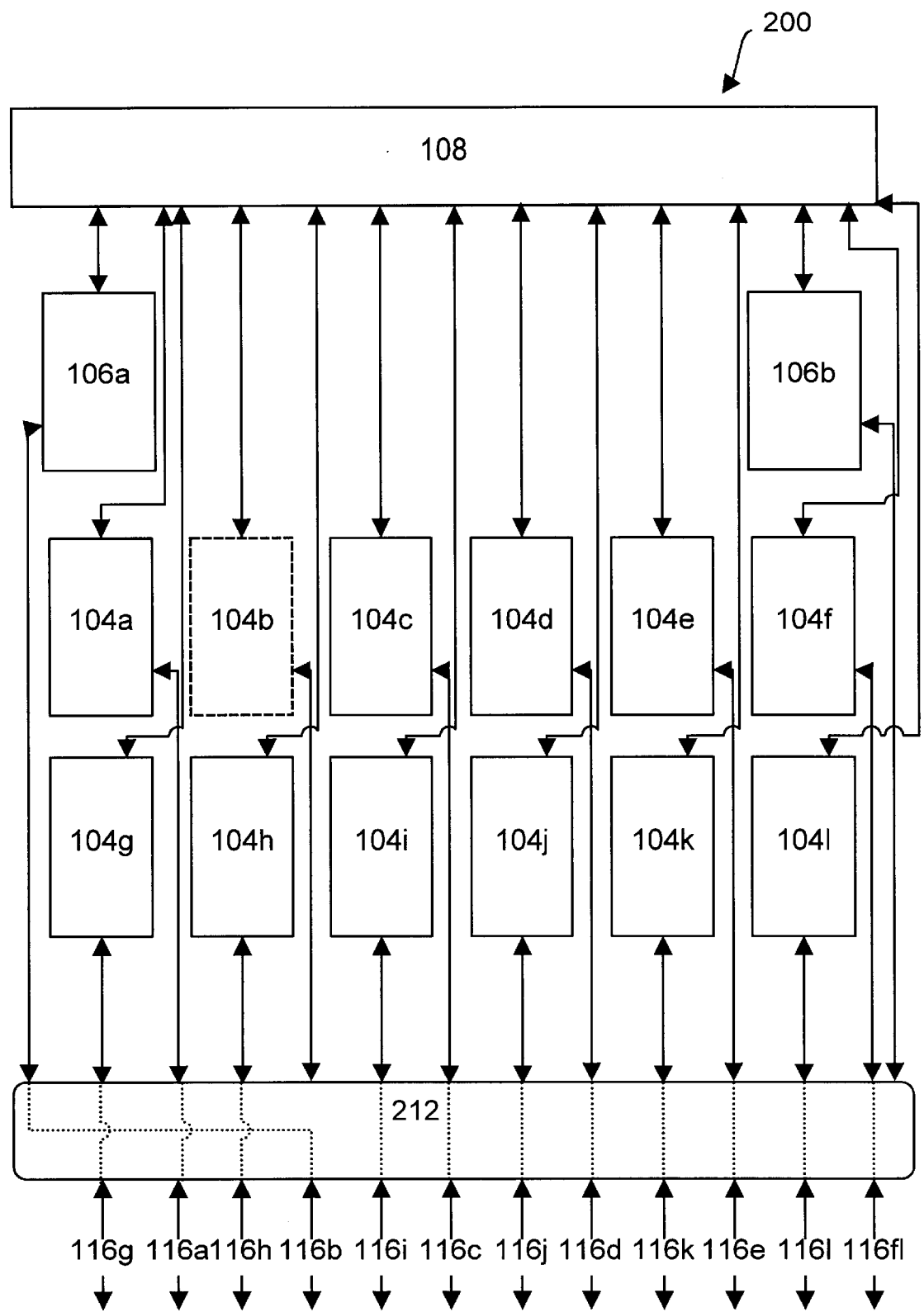
FIG. 8 shows the switch of FIG. 7 with one failure.
Figure 9:
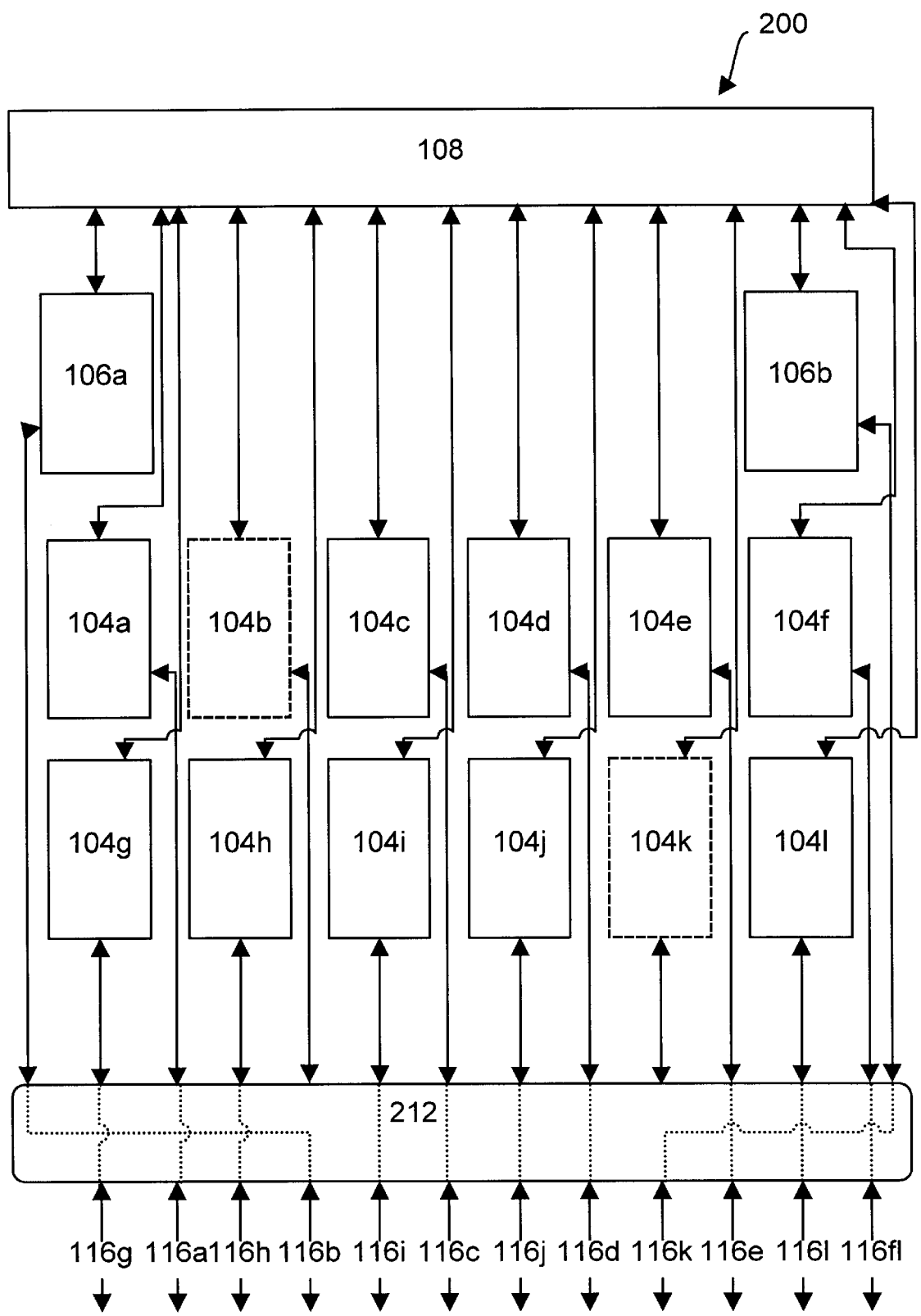
FIG. 9 shows the switch of FIG. 7 with two failures.

FIGS. 7 through 9 show another embodiment of a switch 200 in accordance with the present invention providing m:n sparing. In this embodiment, wherein like components to those of the embodiment of FIGS. 3 through 6 are indicated with similar reference numerals, m spares are provided for n network interface processors and thus switch 200 can accommodate m failures.

In this specific example m=2, with spare network interface processors 106a and 106b being provided, and n=12, with network interface processors 104a through 104l being provided. In the Figure, processor controllers 118 have been omitted for clarity. Sparing panel 212 is much like sparing panel 112, discussed above, except that it can connect a different network cabling line 116 to each of spare processors 106a and 106b.

In this embodiment, each of spare processors 106a and 106b includes sufficient journal memory 120 to store, and operates to store, images of each of the n network interface processors 104 in switch 200. Each spare processor 106 therefore includes an image for each of the n network interface processors 104 in switch 200.

As shown in FIG. 8, when a network interface processor 104 fails, in this particular example network interface processor 104b has failed (as indicated by its being drawn in ghosted line), sparing panel 212 connects network cabling line 116b to one of spare processors 106, in this specific example 106a. Spare 106a loads the corresponding image for network interface processor 104b and commences to operate as a substitute for network interface processor 104b. At this point, spare processor 106b can cease updating the image of network interface processor 104b which is no longer functioning, in its journal memory. More preferably, spare processor 106b will replace its image for network interface processor 104 with an image for spare processor 106a. This image need only include the memory and/or state of spare processor 106a which is required for it to operate as a substitute for network interface processor 104b and will not include any other journal memory of spare processor 106a. In this manner, spare processor 106b can act as a spare for the remaining network interface processors (104a and 104c through 1) as well as a spare for spare processor 106a.

If a failure of a second network interface processor 104 occurs, as shown in FIG. 9 wherein network interface processor 104k has failed, sparing panel 212 connects network cabling line 116k to spare processor 106b which then loads the corresponding image for network interface processor 104k and commences to operate as a substitute for network interface processor 104k and all further updating of images by spare processor 106b ceases.

If a failed network interface processor 104 (such as processor 104b) is repaired and/or replaced, the repaired/replaced network processor 104 can be reconnected to the respective network cabling line 116 (such as line 116b) and can assume processing from the spare processor 106 (such as spare processor 106a) which had been substituted for it. The spare processor 106 can then recommence operating as a spare, and can reconstruct and update images for each network interface processor 104, and for any spare processors 106 which have been substituted for failed network interface processors 104, in switch 200.

The above-described embodiments of the invention are intended to be examples of the present invention and alterations and modifications may be effected thereto, by those of skill in the art, without departing from the scope of the invention which is defined solely by the claims appended hereto.

We claim:

1. A sparing method of accommodating equipment failures in a critical system comprising n pieces of equipment and at least one spare piece of equipment for said n pieces of equipment, comprising the steps of:
   (i) loading software onto each of said n pieces of equipment;
   (ii) commencing execution of said loaded software with said respective piece of equipment;
   (iii) transferring an image of information on each of said n pieces of equipment to a memory on said at least one spare piece of equipment when commencing the execution, said information including said loaded software and a hardware state;
   (iv) detecting a failure of one of said n pieces of equipment;
   (v) causing said at least one spare piece of equipment to replace said detected one piece of equipment by commencing execution of said image corresponding to said detected one piece of equipment, which is stored in the memory, to employ said at least one spare piece of equipment in place of said detected one piece of equipment.

2. The method of claim 1 further comprising the step of, after step (iii), at each of said n pieces of equipment, at selected intervals, transferring to said memory on said at least one spare piece of equipment information to update said image stored in the memory.

3. The method of claim 2 wherein said selected interval corresponds to a selected number of clock cycles on said pieces of equipment.

4. The method of claim 2 wherein said selected interval corresponds to the occurrence of one or more selected events occurring in a respective piece of equipment.

5. The method of claim 1 wherein at least two pieces of spare equipment is provided and, in step (iii) said image is transferred to a memory on each of said at least two spare pieces of equipment, and in step (v) one of said two or more spare pieces of equipment is selected to replace said detected one piece of equipment by commencing execution of said image corresponding to said detected one piece of equipment to employ said at least one spare piece of equipment in place of said detected one piece of equipment, and wherein step (iii) continues to be performed to transfer said images to each remaining one of said at least two spare pieces of equipment.

6. The method of claim 1 wherein said critical equipment is a data and/or telecommunications switch, said pieces of equipment are network interface processors and said state information includes connection state information.

7. The method of claim 2 wherein said critical equipment is a data and/or telecommunications switch, said pieces of equipment are network interface processors and said state information includes connection state information.

8. A sparing system to accommodate equipment failures in a critical system comprising:
   n pieces of equipment, each of equipment including a memory to maintain software to be executed by said piece of equipment and state information for said piece of equipment, said state information including a hardware state;
   at least one spare piece of equipment including a journal memory to store an image of said software and said state information maintained in said memory of each of said n pieces of equipment;
   a communication path between each of said n pieces of equipment and said at least one piece of equipment to allow transfer of the image of each said piece of equipment to said journal memory when each said piece of equipment commences execution of the software, each of said n pieces of equipment operable to transfer the image maintained in a corresponding memory to said journal memory; wherein upon determination that one of said n pieces of equipment has experienced a failure, said at least one spare piece of equipment loads said image corresponding to said one piece of equipment and operates to execute said image to replace said one piece of equipment.

9. The sparing system of claim 8 wherein said images further comprise state information for each said respective piece of equipment.

10. The sparing system of claim 8 wherein each of said n pieces of equipment updates said corresponding image in said journal memory of said at least one spare piece of equipment at preselected intervals.

11. The sparing system of claim 8 comprising at least two spare pieces of equipment each of which is operable to store said image of each of said n pieces of equipment and wherein upon determination that one of said n pieces of equipment has experienced a failure, a selected one of said at least two spare pieces of equipment loads said image corresponding to said one piece of equipment and operates to execute said image to replace said one piece of equipment and each remaining one of said at least two spare pieces of equipment continues to store said images and can operate to substitute for a subsequent failed piece of equipment.

* * * * *